UNITED STATES PATENT OFFICE.

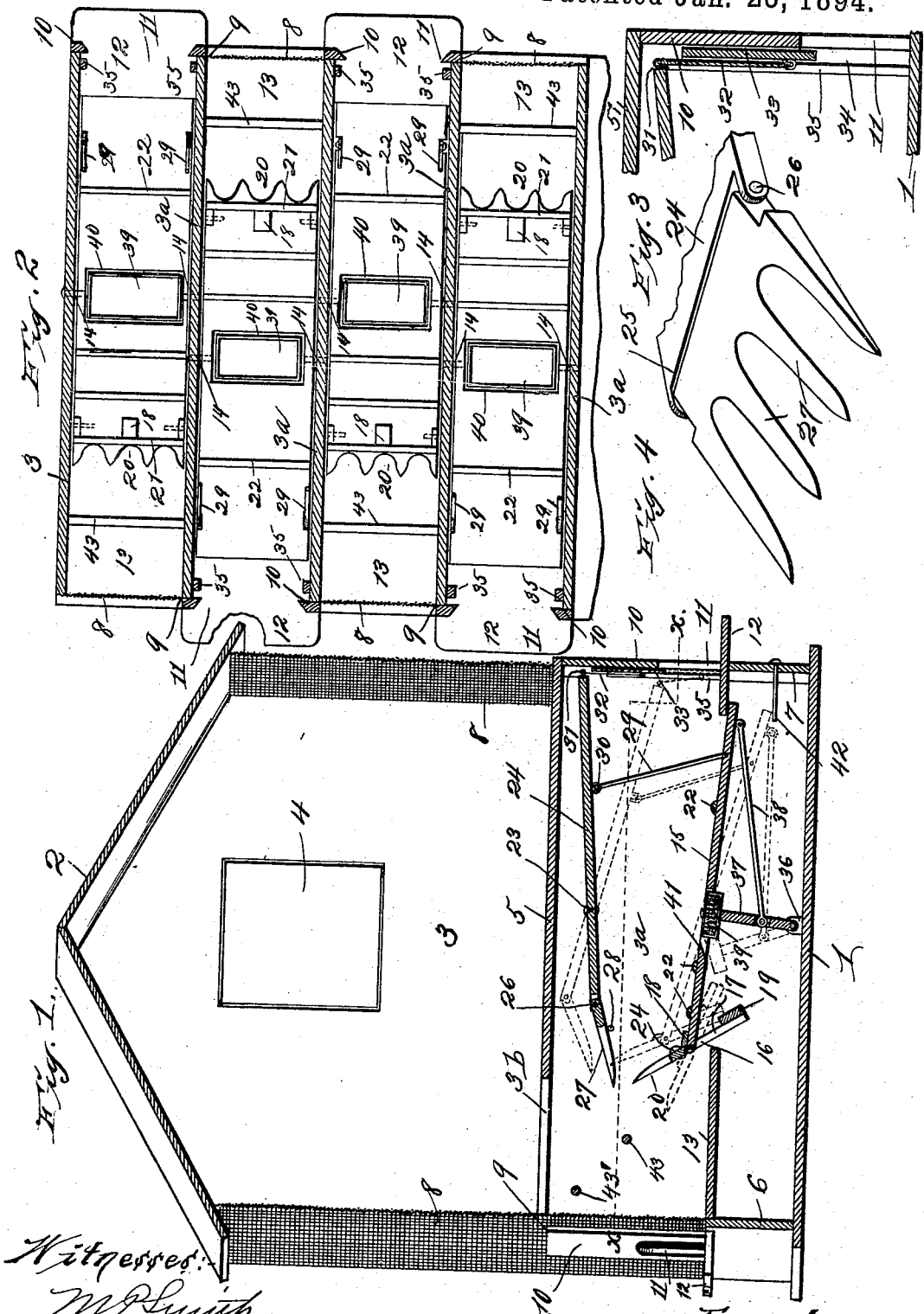

JOSEPH W. HENRY, OF KANSAS CITY, MISSOURI.

SPARROW-TRAP.

SPECIFICATION forming part of Letters Patent No. 513,184, dated January 23, 1894.

Application filed August 12, 1893. Serial No. 482,990. (No model.)

*To all whom it may concern:*

Be it known that I, JOSEPH W. HENRY, of Kansas City, Jackson county, Missouri, have invented certain new and useful Improvements in Sparrow-Traps, of which the following is a full, clear, and exact description, reference being had to the accompanying drawings, forming a part hereof.

My invention relates to devices for catching birds, and has for its objects to produce a device of this character which is simple, durable and inexpensive of construction, and positive and reliable in operation.

With these objects in view, my invention consists in certain peculiar and novel features of construction and arrangement, and combinations of parts, as will be hereinafter described and claimed.

In order that my invention may be fully understood, I will proceed to describe it with reference to the accompanying drawings, in which—

Figure 1, is a sectional perspective view of a bird trap constructed in accordance with my invention. Fig. 2, is a horizontal sectional view taken on the line $x$—$x$ of Fig. 1. Fig. 3, is an enlarged vertical section of a portion of the device to show more clearly the entrance hole or opening, and the door adapted to close the same. Fig. 4, is a detail perspective view of one of the upper pronged guards, and showing it pivotally connected to the front end of the pivotal door-carrying plate.

My invention comprises essentially an upper compartment, and a series of lower compartments separated from each other but communicating with the upper compartment. Each of these lower compartments is formed with an entrance hole at one end and the opposite end is closed with a suitable foraminous material. A trip-plate is pivotally mounted in each compartment about in the same horizontal plane as the lower margin of the entrance hole or opening, and connected to said trip-plate is an upper plate which carries a slide-door to close the entrance hole. A pair of pivotal pronged-guards are carried at the inner ends of the trip and upper plates, and are adapted to yield to allow the passage of the bird in one direction, and to prevent the return of the bird from the opposite direction. A pivotal box provided with feed is also connected to the trip-plate in such manner that as the bird hops or steps upon the trip-plate the box having feed will be moved out of sight of and be inaccessible to the bird.

Referring now to the drawings in detail, 1 designates the bottom of the trap, and 2 the top or roof. The bottom and roof are connected by end-walls 3, one only of which is shown, and each end-wall is provided with an opening in which is hinged the door 4, by which the birds may be removed from the trap, as hereinafter explained.

Arranged horizontally and dividing the trap into an upper and lower compartment is a partition 5, said partition being arranged a suitable distance above the bottom 1. The lower compartment is divided by means of a series of vertical and transverse partitions $3^a$, arranged parallel with the end walls 3, into a series of narrow and transversely extending compartments, which communicate with the upper compartments through their respective openings, $3^b$ in the horizontal partition 5. Arranged vertically near each side margin of the bottom 1 and extending longitudinally from end wall to end wall are the side strips or boards 6 and 7, and these side strips or boards are connected at their upper margins with the roof by means of the wire mesh 8 or other foraminous material; this wire mesh thus forming the sides of the trap. The wire mesh forming the sides of the trap are cut away in that portion below the horizontal partition 5 to form a series of notches or openings 9, these openings communicating alternately with the opposite ends of the compartments or passages below the partition. Closing these notches or openings 9 are boards or plates 10 which are formed in their lower margins with entrance holes or recesses 11, and arranged horizontally at the lower margin of said entrance holes or openings and resting upon the said strips or boards 6 and 7 are the foot rests or platforms 12 which project a suitable distance inward and outward of said entrance holes or openings. Projecting inwardly for a suitable distance from the opposite ends of said compartments or passages, that is, from the ends closed by the wire mesh, and in the same horizontal plane as the foot platforms 12, are platforms 13; these platforms 13 being arranged horizontally and beneath the openings 3ᵇ in the horizontal partition 5. Pivotally mounted upon trunnions 14 which project inwardly of each passage from the partition walls 3ª, are the trip-plates 15, and these trip-plates are adapted in their normal position to bear at their upper sides and outer ends against the under side of the inwardly projecting portion of the foot-platform 12. The inner or opposite end of these trip-plates are preferably reduced slightly in width to pivotally engage a recess or opening 16 in a plate 17, and each trip-plate is also provided at its upper side with the transverse extending stop-piece 18 which is adapted to limit the pivotal approach of the plate 17 to a vertical position, the weight-strip 19 secured to the lower end of said plate tending to force it to a vertical position. Formed integral with preferably, or secured to the upper end of the plate 17 is an extension consisting of a series of prongs or forks 20, and by reason of the stop-piece 18 and the weight strip 19 said prong or pointed portion or guard projects normally upward and toward the foraminous end of the passage or compartment. A transverse guide step 21 is secured to the pivotal-guard consisting of the plate and the prong or pointed portion, above its pivotal point, the purpose of which will be hereinafter explained, and the upper side of each trip-plate is also provided with a series of guide-steps or strips 22 at opposite sides of its pivotal point.

Pivotally mounted upon cross-rods 23, arranged vertically above and a suitable distance from the pivotal point of the trip-plates is a series of plates 24, and the inner ends of said plates are recessed as shown at 25, and pivotally mounted upon pins 26 in said recesses are the pronged-guards 27; said pronged-guards being arranged vertically above the pronged-guards carried by the trip-plates, and in order to support the pronged-guards 27 in a position normally approximating the horizontal are provided the cross pins 28. At the side of the pivotal point 23, opposite to that occupied by the pronged-guard 27, and near each side margin, the upper ends of a pair of rods 29, are pivotally connected as at 30, to each plate 24, and these rods are pivotally connected also to the corresponding trip-plate 15, a suitable distance from its pivotal point.

Projecting outwardly from the ends of the plates 24 are pins 31, and these pins 31 are connected through the medium of cords or other flexible connections 32 with the sliding doors 33; these sliding doors being adapted to close the entrance holes as hereinafter explained, and traveling in the grooves 34 formed by the boards or plates 10 and the vertical strips or cleats 35 secured to the partition walls 3ª as shown. Pivotally mounted between ears or lugs 36 projecting upwardly from the floor or bottom 1 of the trap, are the upwardly extending bars 37, and these bars are pivotally connected through the medium of the links 38 with the under side of the trip-plates 15, and adjacent to the connecting point of the rods 29. Carried rigidly upon the upper end of the pivotal bars 37 are boxes or receptacles 39 in which are placed feed of any suitable kind which is likely to attract the birds, and these feed boxes or receptacles occupy normally openings 40 formed through the trip-plates 15 at their pivotal points. The inner margin of said opening is preferably beveled as shown at 41, so as to allow the free pivotal movement of the bar 37, as hereinafter explained. When it is desired to catch birds, the feed boxes 39 are supplied, and the operative parts of the device occupy the position shown in full lines Fig. 1. Now when the bird lights upon one of the platforms 12 and peers through the entrance hole 11 the first object which strikes its eye is the box 39 supplied with feed. Should he then hop through the entrance hole and light upon the guide step 22 which is arranged preferably at hopping distance from the platform 12 and a suitable distance from the pivotal point of the trip-plate, the said plate will immediately pivotally operate to the position shown in dotted lines, until the downward movement of the outer end of said plate is arrested by the stop-pin or rod 42, and by reason of the obliquely arranged connecting links 29, the corresponding upper plate 24 is caused to pivotally operate simultaneously with the trip-plate 15, and about twice the distance of said plate, so as to allow the slide door by gravity to descend and close the entrance hole. Simultaneously also with the movement of the trip-plate, the connecting rod or link 38 forces the bar 37 pivotally to the position shown in dotted lines so that the feed shall be inaccessible to and out of sight of the bird. The entrance end of the compartment or passage, by reason of the entrance hole being closed is darkened and the bird peering forward sees the light entering through the wire mesh forming the opposite end of said compartment or passage, and hops toward the same, and lighting or stepping upon the guide strip 21 of the pronged guard causes the trip-plate, the upper plate, the door and the pivotal feed-carrying bar to resume their original position. By lighting upon the guide step 21, the weight 19 is overbalanced and the pronged-guard swings to the position shown in dotted lines, Fig. 2, the weight of the bird holding the weighted lower end up against the bottom of the trip-plate. The bird then hops upon the leading-step 43. Should the passage between the adjacent ends of the pronged-guards carried by the trip-plate and the plate 24 be too narrow, even after the lower one was pivotally operated, the upper one will yield also to allow the bird to pass through. Immediately the bird hops from the lower pronged guard the weight bar or strip 19 causes it to resume its original position, and then any attempt of the bird to pass back between the pronged-guards will be resisted by the stop-piece 18 of the trip-plate, and by the inclined position of the upper guard 27. The bird now naturally passes to the upper compartment by means of the leading step 43', and opening 3ᵃ, from which it is impossible to escape. When it is desired to remove the birds, a hand may be introduced through the opening closed by the hinged door 4. By arranging the passages or compartments with their entrance holes at opposite sides or alternately as before explained, the birds may enter the trap from each side. By reason of the platform 13, the bird is prevented from hopping upon the bottom or floor 1.

From the above description, it will be seen that I have produced a bird trap which is simple, durable and inexpensive of construction and positive and reliable in operation.

Having thus described my invention, what I claim as new, and desire to secure by Letters Patent, is—

1. A bird-trap, comprising an upper compartment, and a series of lower compartments or passages communicating with said upper compartment, and having one end provided with an entrance hole and the other end closed by a foraminous material, a pivotal trip-plate mounted in each lower compartment or passage, and carrying pivotally at its end adjacent to the end of the passage closed by the foraminous material, a pronged-guard, and a companion plate pivoted in each compartment above said trip-plates, and pronged-guards also carried at the inner ends of said companion plates, and a link-bar pivotally connected to the said plates, and a slide-door carried by the upper plate, and adapted when the lower plate is depressed at its outer end to close the entrance hole, substantially as set forth.

2. A bird-trap, comprising a compartment or passage having an entrance hole at one end, and having its opposite end closed with a foraminous material, a trip-plate pivotally mounted in said passage, and a companion plate also pivotally mounted in said passage and above the trip-plate, and a link bar or rod pivotally connecting said plates, and a slide-door adapted by gravity to close the entrance hole, and pronged-guards pivotally carried at the inner ends of the said trip-plate and its companion plate, and to allow passage there between in one direction, but to resist it from the opposite direction, substantially as set forth.

3. A bird-trap, comprising a compartment or passage, having an entrance hole at one end, and a foraminous material closing the opposite end, a trip-plate pivotally mounted in said passage, and having an opening, a companion plate pivotally mounted in said passage above the trip-plate, and pronged-guards pivotally carried at the inner end of said plates, and a cross-pin to support the upper pronged-guard, and a rod pivotally connecting said plates, and a bar pivotally mounted in said compartment or passage and below the trip-plate, and a feed-box carried by said bar and normally occupying the opening of the trip-plate, and a rod pivotally connecting the trip-plate and the feed box carrying bar, substantially as set forth.

4. A bird-trap, comprising a compartment or passage, provided with an entrance hole at one end and an inwardly and outwardly projecting foot platform at the lower margin of said entrance hole, and a foraminous wall closing the opposite end of said compartment, and a platform extending inwardly from said wall, and a stop-pin arranged a suitable distance beneath the inwardly extending portion of the foot platform of the entrance hole, and a trip-plate pivotally mounted in said compartment or passage and having its outer end normally bearing against the under side of the inwardly extending portion of the foot-platform, and provided with an opening having its inner margin beveled, and a weighted pronged-guard pivotally carried at the inner end of said trip-plate, and a stop-piece to limit the pivotal movement of the pronged-guard in one direction, and guide-steps upon the trip-plate and the pronged-guard, and a bar pivotally mounted below the trip-plate, and a feed-box carried at the upper end of said bar, and normally occupying the opening of the trip-plate, and a rod pivotally connecting the pivotal bar with the trip-plate, and a plate pivoted above the trip-plate and pivotally connected thereto, and a slide-door suitably guided and connected to the last mentioned pivotal plate, and a pronged-guard pivotally carried at the inner end of said plate, substantially as set forth.

5. A bird-trap, comprising an upper compartment and a series of lower compartments separate from each other and each communicating with the upper compartment, said lower compartments or passages having one end closed by a foraminous material and the other end closed by a plate provided with an entrance hole, a foot-platform extending inwardly and outwardly from the lower margin of said entrance hole, and a platform extending inwardly from the opposite end of said compartment or passage and beneath the opening through which the lower compartment communicates with the upper compartment, and leading steps extending transversely of the lower compartment or passage and over said platform, a trip-plate pivotally mounted within said compartment or passage, and a pronged-guard pivotally carried at the inner end of said trip-plate, and a companion plate pivotally mounted above the trip-plate, and also carrying pivotally at its inner end a pronged-guard, a rod pivotally connecting said plates, and a sliding door carried by the upper plate, and adapted by gravity to descend and close the entrance hole, substantially as set forth.

In testimony whereof I affix my signature in the presence of two witnesses.

JOSEPH W. HENRY.

Witnesses:
MAUD FITZPATRICK,
M. P. SMITH.